United States Patent
Jackson (12)

(10) Patent No.: US 6,269,948 B1
(45) Date of Patent: *Aug. 7, 2001

(54) LUGGAGE FOR NOMADIC COMPUTING

(76) Inventor: W. Shaun Jackson, 301 Golfview La., Ann Arbor, MI (US) 48103

( * ) Notice: Subject to any disclaimer, the term of this patent is extended or adjusted under 35 U.S.C. 154(b) by 0 days.

This patent is subject to a terminal disclaimer.

(21) Appl. No.: 09/337,774

(22) Filed: Jun. 22, 1999

Related U.S. Application Data

(63) Continuation-in-part of application No. 09/013,377, filed on Jan. 26, 1998, now Pat. No. 5,971,148.
(60) Provisional application No. 60/090,369, filed on Jun. 22, 1998.

(51) Int. Cl.[7] .................................................. B65D 85/38
(52) U.S. Cl. ........................... 206/320; 108/43; 190/102; 190/111; 190/119; 206/216; 248/174; 248/918
(58) Field of Search ................................. 108/25, 43, 166; 206/305, 320, 576, 216; 224/267; 229/87.01, 87.15; 190/102, 107, 111, 119, 902; 364/708.1; 248/174, 918, 919

(56) References Cited

U.S. PATENT DOCUMENTS

| D. 344,074 | 2/1994 | Collins ................................. D14/106 |
| D. 346,901 | 5/1994 | Dulka et al. ........................... D3/289 |
| D. 360,075 | 7/1995 | Cross et al. ........................... D3/276 |
| D. 360,978 | 8/1995 | Willard ................................. D3/301 |
| D. 380,612 | 7/1997 | Kelley et al. .......................... D3/289 |
| 1,121,422 | 12/1914 | Tydings ............................. 206/216 X |
| 1,980,683 | 11/1934 | Herrmann ........................ 190/119 X |
| 2,319,497 | 5/1943 | Franklin ........................... 190/107 X |
| 2,609,072 | 9/1952 | Levinson ................................. 190/11 |
| 3,188,046 | 6/1965 | Cervenka ............................. 248/441 |
| 4,318,471 | 3/1982 | Hutton ................................. 206/214 |
| 4,562,952 | 1/1986 | Chinman ............................. 229/87 A |
| 4,627,223 | * 12/1986 | Janhonen .......................... 229/87.01 |
| 5,105,338 | 4/1992 | Held ..................................... 361/391 |
| 5,127,339 | 7/1992 | Hood, Jr. ................................ 108/43 |
| 5,217,119 | 6/1993 | Hollingsworth ...................... 206/583 |
| 5,348,347 | * 9/1994 | Shink ................................... 206/576 |
| 5,362,063 | 11/1994 | Cummings ........................... 273/287 |
| 5,379,893 | 1/1995 | Ruiz ..................................... 206/320 |
| 5,400,903 | 3/1995 | Cooley ................................. 206/320 |
| 5,437,367 | 8/1995 | Martin ................................. 206/320 |
| 5,445,266 | 8/1995 | Prete et al. ........................... 206/320 |

(List continued on next page.)

FOREIGN PATENT DOCUMENTS

| 92301641 | 2/1992 | (EP) . |
| 94107300 | 5/1994 | (EP) . |
| 97103026 | 2/1997 | (EP) . |

*Primary Examiner*—Jim Foster
(74) *Attorney, Agent, or Firm*—Gifford, Krass, Groh, Sprinkle, Anderson & Citkowski, PC

(57) ABSTRACT

An article for use with a laptop computing device protects the device during periods of non-use, including transport, while stabilizing the device when positioned on a user's lap. The article provides a base panel having front, rear and two side sections, a lower surface adapted to rest on a user's lap, and an upper surface to receive the bottom surface of the laptop device. The preferred embodiment includes two side panels, each with a storage compartment, which may be dressed over the user's thighs to assist in stabilizing the laptop device during use. Attachment means are preferably provided for securing the side panels to one another across the top surface of the computing device during periods of non-use or transport. Preferably flexible front and rear panels may also be folded over and onto the top surface of the computer in overlapping fashion beneath the secured side panels to create a protective device wrapper in conjunction with surrounding closure means and a carrying handle. When unfolded, the front panel may be draped at least partially over and in front of the user's knees, and the rear panel may be rolled into a palm rest.

14 Claims, 7 Drawing Sheets

U.S. PATENT DOCUMENTS

| | | | |
|---|---|---|---|
| 5,467,853 | 11/1995 | Pelletier | 190/11 |
| 5,494,157 | 2/1996 | Golenz et al. | 206/370 |
| 5,524,754 | 6/1996 | Hollingsworth | 206/320 |
| 5,596,482 | 1/1997 | Horikoshi | 361/683 |
| 5,607,054 | 3/1997 | Hollingsworth | 206/320 |
| 5,639,004 | 6/1997 | Carlton et al. | 224/579 |
| 5,647,484 | 7/1997 | Fleming | 206/576 |
| 5,677,827 | 10/1997 | Yoshioka et al. | 361/685 |
| 5,680,914 | 10/1997 | Reiser | 190/11 |
| 5,732,910 | 3/1998 | Martin | 248/118 |
| 5,762,250 | 6/1998 | Carlton et al. | 224/579 |
| 5,871,094 | 2/1999 | Leibowitz | 206/320 |
| 5,878,672 * | 3/1999 | Ostermann et al. | 108/25 |
| 5,887,777 | 3/1999 | Myles et al. | 190/102 X |
| 5,971,148 * | 10/1999 | Jackson | 206/320 |

* cited by examiner bottom view

LUGGAGE FOR NOMADIC COMPUTING

REFERENCE TO RELATED APPLICATION

This application is a continuation-in-part of co-pending U.S. patent application Ser. No. 09/013,377, filed Jan. 26, 1998 U.S. Pat. No. 5,971,148; and also claims priority of U.S. provisional application Ser. No. 60/090,369, filed Jun. 22, 1998, the entire contents of both are incorporated herein by reference.

FIELD OF THE INVENTION

This invention relates generally to luggage, carrying cases, and the like, and, in particular, to an article configured for use with a laptop electronic device such as a notebook computer.

BACKGROUND OF THE INVENTION

It is ironic that laptop computers are often difficult to utilize when positioned on a user's lap. One reason for this is that such devices often have smooth bottom surfaces. In addition, laptop devices such as notebook computers have become increasingly smaller and lighter in weight, causing them to be more subject to physical instability when positioned across a user's thighs. In addition, the flat-panel displays manufactured for use with such devices have become larger, whereas the keyboard-containing base unit has become thinner, causing the overall configuration to become more top-heavy as compared to previous devices, which tend to be heavier and more bulky.

Various carrying cases have been devised for laptop computers. Representative examples may be found in U.S. utility Pat. Nos. 5,105,338; 5,217,119; 5,379,893; 5,494,157; and 5,524,754; and U.S. Design Pat. Nos. 344,074; 346,901; 360,075; 360,978; and 380,612. In all of these examples, the carrying case is primarily intended for stowage and transport, and not for use; that is, the computer must be removed from its carrying case and utilized separately.

Certain more recent patents enable the computer to be used in conjunction with a carrying case, such as U.S. Pat. No. 5,400,903, which provides a suitcase-shaped unit that can to be placed on one's lap, with a cover that is unfolded, and side drawers (75) that may be pulled out. U.S. Pat. No. 5,607,054 resides in a folio carrying case for a notebook computer having front and rear flaps, the former of which may be folded underneath the device to provide a slanted base. U.S. Pat. No. 5,639,004, entitled CONVERTIBLE CARRYING CASE AND WORK PLATFORM FOR SMALL ELECTRONIC DEVICES, includes a neck strap enabling the user of the device to walk and compute at the same time.

In all cases just referenced, however, even those wherein the device may remain in contact with the carrying case during use of the computer, no features are provided for actually stabilizing the overall physical arrangement when positioned on one's lap which, after all, is the very environment wherein these devices are intended to be used. Even in the case of U.S. Pat. No. 5,607,054, which includes forward and rearward flaps which may be folded under the device during use, it is clear that these features provide utility only for a desktop, as opposed to a laptop, surface. Accordingly, the need remains for an article of luggage or a carrying case which may remain in contact with a piece of electronic apparatus such as a laptop computer, but which further provides means for stabilizing the configuration on one's lap during use.

SUMMARY OF THE INVENTION

The present invention provides an article for use with a laptop computing device which both protects the device during periods of non-use, including transport, while stabilizing the device when positioned on a user's lap.

Broadly, the invention includes a base panel having front, rear and two side sections, a lower surface adapted to rest on a user's lap, and an upper surface to receive the bottom surface of the laptop device. A side panel extends outwardly from one of the side sections of the base panel which, during use of the laptop device, may be draped at least partially down the outer side surface of the user's thigh, thereby helping to stabilize the positioning of the device during use of the computer.

The preferred embodiment includes two such side panels, one on each side of the base panel, which help to keep the user's knees together. Weights may be added to each side panel though, more preferably, each side panel features a storage compartment which is accessible when the panels are in an unfolded configuration.

In the preferred embodiment the base panel is at least partially stiffened, whereas the side panels are least partially flexible, enabling them to function as flaps which may be folded over and across the top surface of the computer during periods of stowage or transport. Attachment means are preferably provided for securing the side panels or flaps to one another when folded across the top surface of the computing device.

The article may further include front and rear panels respectively attached to the front and rear sections of the base panel. These panels are also preferably flexible in nature, enabling them to function as flaps which may be folded over and onto the top surface of the computer in overlapping fashion, preferably beneath the side panels when secured to one another. When unfolded, the front panel may be draped at least partially over and in front of the user's knees, and the rear panel may be rolled into a palm rest. A carrying handle is preferably attached proximate the rear section of the base panel.

According to different alternative embodiments, the various panels and components need not be permanently affixed to one another, and may, in fact, attach to the computing device itself. One or more "tunnels" may also be provided for the purpose of dressing cabling from one part of the arrangement to another. The storage compartments may be secured through some sort of temporary fastening means, so that they may be used by themselves as a clutch bag, purse, and so forth. In addition to side pockets and pouches forward and/or rearward pockets and/or pouches may also be provided. Particularly those layers used directly beneath the device may further include air pockets or other thermally non-conducting materials to ensure that when the device is placed upon a user's lap, discomfort due to overheating is minimized.

DETAILED DESCRIPTION OF THE INVENTION

This invention resides in a luggage-type article configured for use with a laptop electronic device such as a laptop or notebook computer which both protects the device during periods of stowage and transport, while stabilizing the device when positioned on a user's lap. Thus, depending upon the configuration, the article functions as a protective carrying case during transport while providing a laptop work environment during use.

Although ideally suited for use with available computers of the type having integrated flat-panel displays, the article is equally applicable to other existing or yet to be developed electronic apparatus intended for laptop use including keyboards, game controllers, and telecommunications or data communications devices, including those relying on a detached display device. Thus, use herein of the terms "computer" and "device" in the specification and claims should be taken to include all alternative forms of hardware just mentioned.

Figure 1:
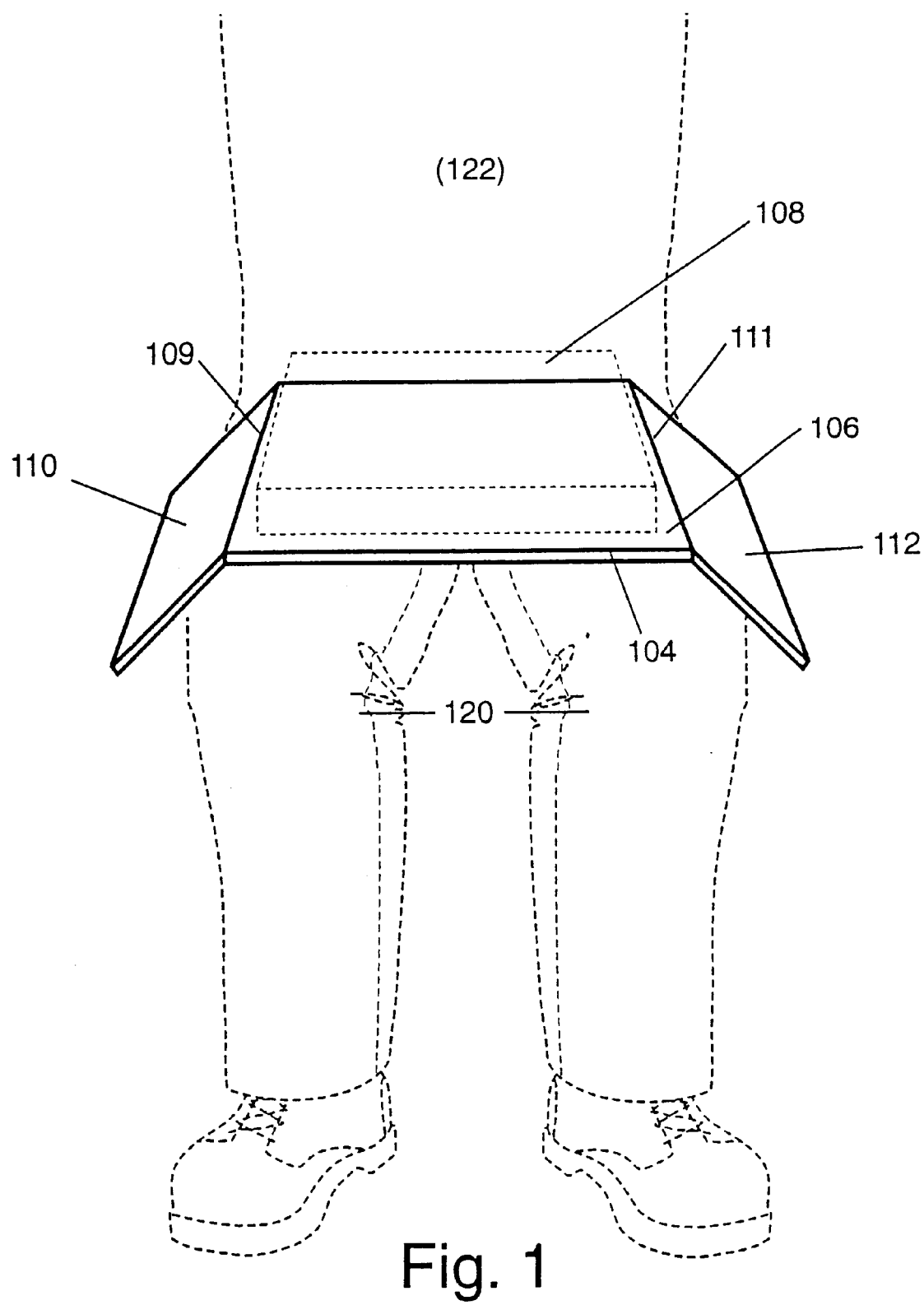
FIG. 1 is a drawing introducing basic principles according to the invention, as seen from a point in front of a seated user, shown in phantom.

FIG. 1 illustrates general principles according to the invention. Broadly, the invention includes a base panel 104 sized to rest upon the lap of an individual 122 in a generally horizontal orientation during use. This panel 104 has an upper surface 106 to receive a device 108 having top and bottom surfaces. Connected to the base panel 104 on either side are side panels 110 and 112, which may be hingedly affixed to the panel 104 along edges 109 and 111, respectively. Although only one of the panels 110 or 112 may be present according to the invention, two such panels are preferably utilized in order to help the user 122 hold his or her knees 120 together, which might otherwise require prolonged use of the adductor muscles, which may become tiring.

Panels 104, 110 or 112 may be composed of a variety of different materials while keeping within the scope of this invention. For example, all such panels may be entirely flexible, in which case defined edges 109 and 111 would not be present, but rather, panel 104 would smooth the transition into the side panels with the overall structure draped over the user's thighs on either side. In the preferred embodiment, however, at least panel 104 is stiffened in some manner to provide a better support for the device 108.

The side panels 110 and 112, however, are preferably flexible in nature and, in fact, sized such that they fold up and over onto the device 108 to provide protection and/or cushioning during transportation, as described in further detail below. Side members 110 and 112 are preferably weighted in some manner to help with stabilizing the overall structure during use. Although non-functional weights may be added along the lower edges of the side members 110 and 112, for example, preferably storage compartments are added as described below, thereby providing the dual purpose of affording additional utilization compartments and stabilization.

Figure 2:
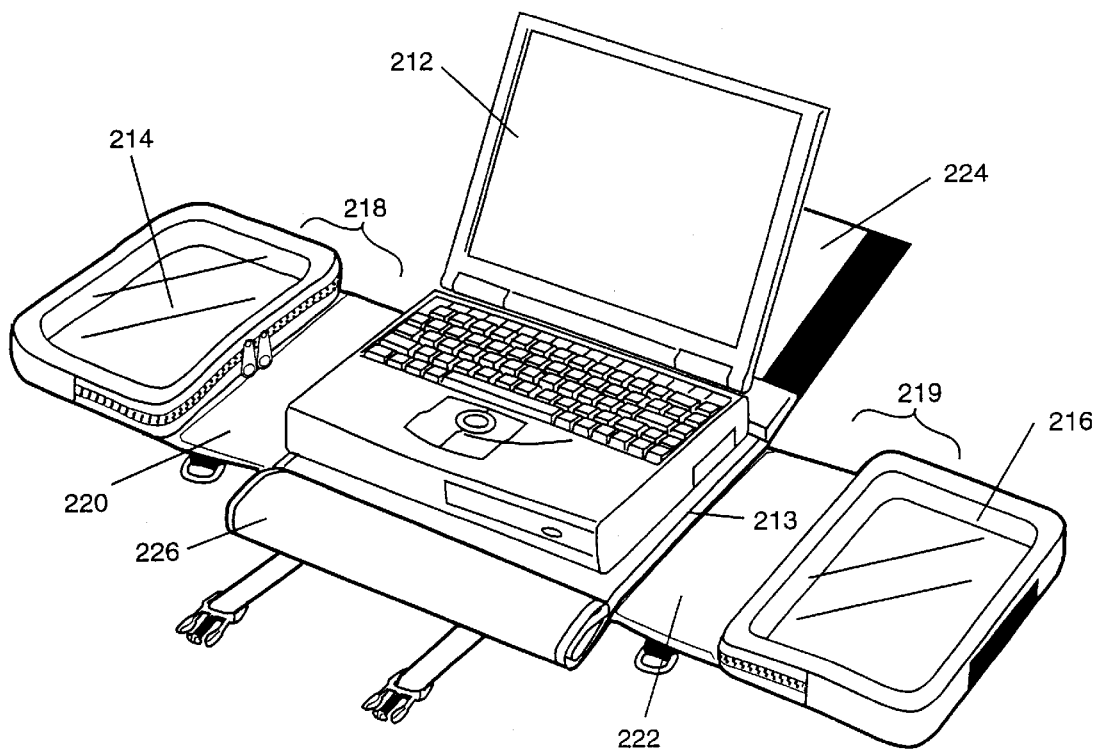
FIG. 2 is an oblique drawing of a comprehensive configuration of the invention including dual side panels with pouches and front and rear flaps.

Now turning to FIG. 2, a computing device 212 having a bottom surface (not visible in this drawing) rests on the upper surface 213 of the base panel. The lower surface of the base panel (also not visible) rests against the upper surface of the user's thighs, as better seen in FIG. 3, with at least one of the upper and lower surfaces of the base panel being preferably non-slip in nature.

Side panels 218 and 219 extend outwardly on either side of the base panel, each side panel preferably including a storage compartment in the form of zippered pouches 214 and 216 which accommodate computer-related accessories such as power supplies, CD-ROMs, diskettes, modems, cords, and the like. As discussed above, the side panels are preferably flexible at least in regions 220 and 222, enabling the panels to be dressed along the outer thighs of a user in a seated position, as perhaps best understood with reference to FIG. 3 which shows the invention in use with a computer on the lap of a user.

Figure 3:
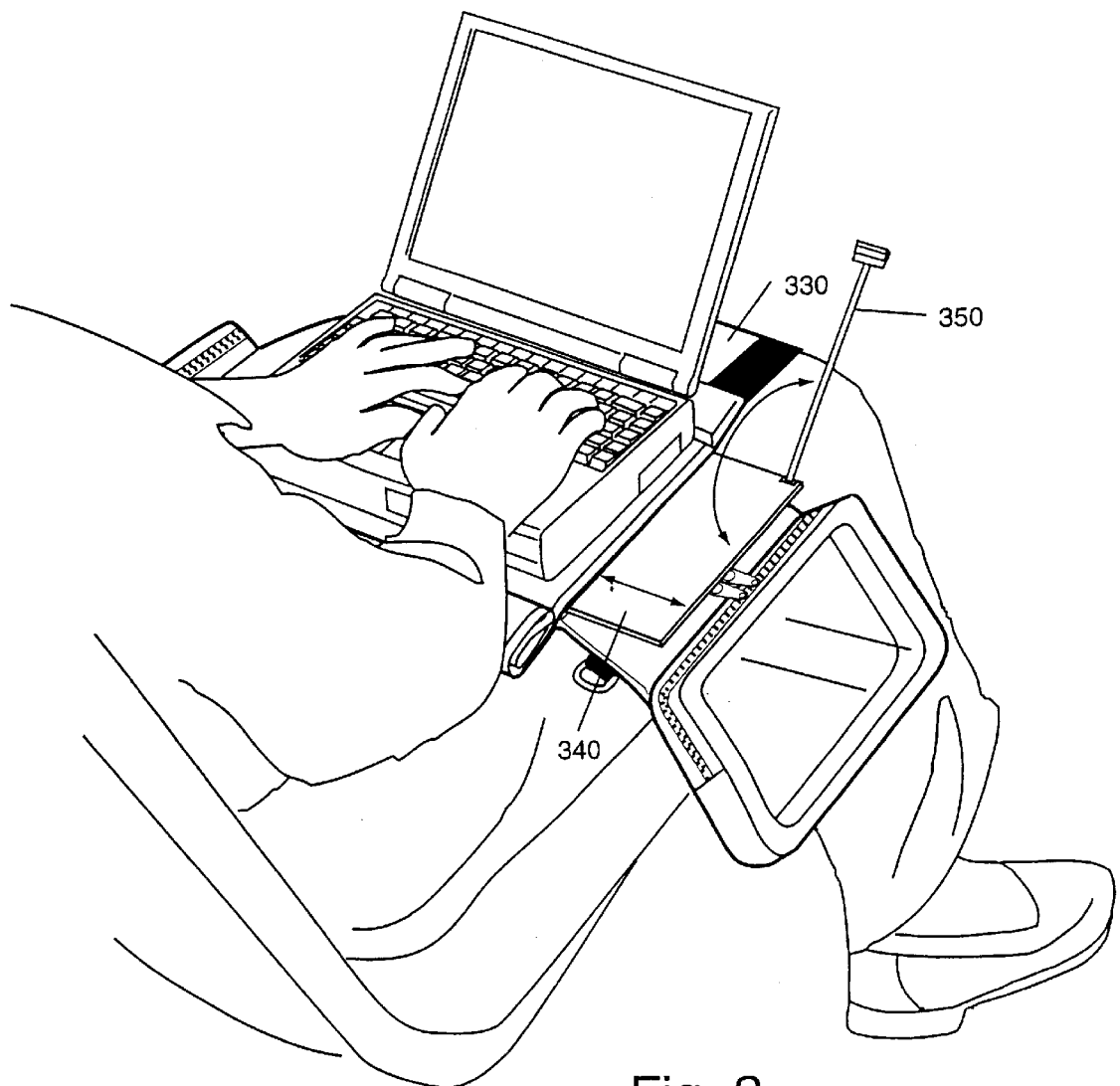
FIG. 3 is an oblique drawing which shows the configuration of FIG. 2 in use on an individual's lap.

As a further convenience, the invention may include front and rear panels 224 and 226, respectively. These are preferably provided in the form of flexible flaps, enabling the rear panel to be rolled up, for example, and conveniently used as a palm rest as shown in FIGS. 2 and 3, and with the front panel 224 draping over and in front of at least a portion of the user's knees. In this configuration, the forward flap may also act as a modesty panel for female users. As an added feature, the forward flap 224 may be sized to hold papers or other materials with the addition of a user accessible pouch, or the like or, alternatively, may be folded or rolled to prop up the back section of the computer, as desired.

Referring to FIG. 3, note that with the side pouches dressed over the legs of the user as shown, the user may conveniently gain access to either compartment during use of the computer 112. Note further that certain options are available such as a member 330, though not necessary to the invention, to assist in stabilizing the computer against forward movement. As yet a further option, preferably rigid pull-out panels may be provided on either or both sides of the assembly, as illustrated by panel 340 in FIG. 3. If provided on both sides, such panels may overlap one another when stowed, thereby enabling either or both to be pulled out to substantially the full width of the device 112. As yet a further different feature, a flip-up document holder 350 may be provided as shown. In this case, the document holder 350 would have a folded-down state wherein it may be slid over and against the side of the device 112 when not in use, and flipped up and unfolded to hold documents, for example, for transcription purposes. It will be appreciated to one of skill in mechanics that different versions of a flip-up document holder may be provided with or without slide-out surfaces such as 340, including hinged wire-frame forms, and so forth. One advantage of providing a surface on element 340, however, is that it may, itself function as a document rest, mouse pad, or peripheral equipment stand.

Figure 4:
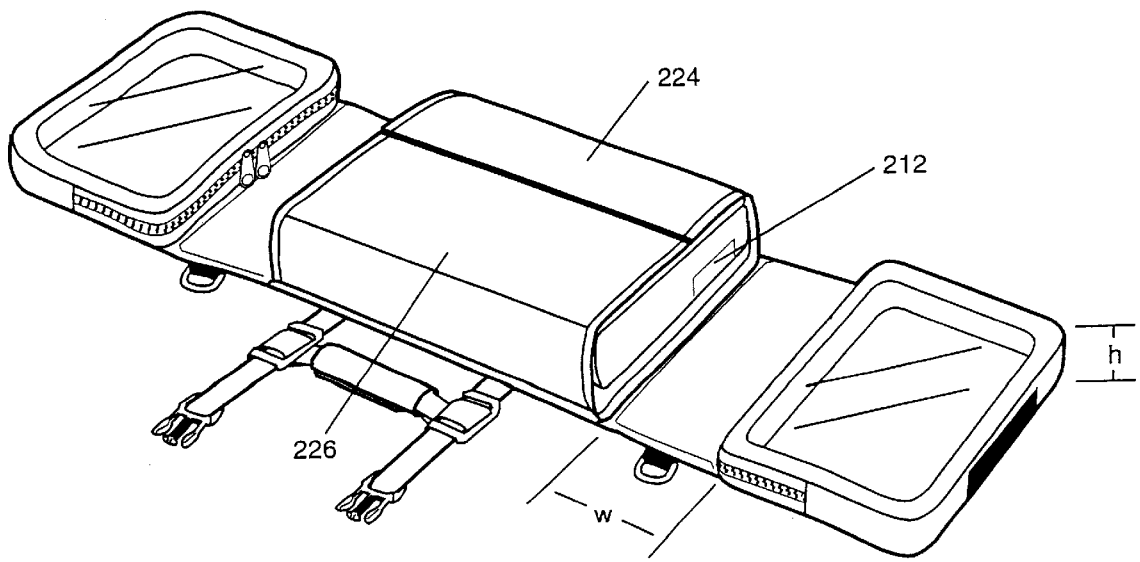
FIG. 4 is an oblique drawing which helps o visualize the way in which the various flaps and panels are folded over and onto the computer for stowage and/or transport.

FIG. 4 helps to visualize the way in which the various panels may be folded onto one another in order to realize a protective transport wrapper. For example, in the preferred embodiment, the rear panel 226 may be first folded onto the computer as shown, with the front panel 224 being overlapped and held in place, for example, using hook-and-loop fasteners therebetween, which are hidden in this drawing.

Figure 5:
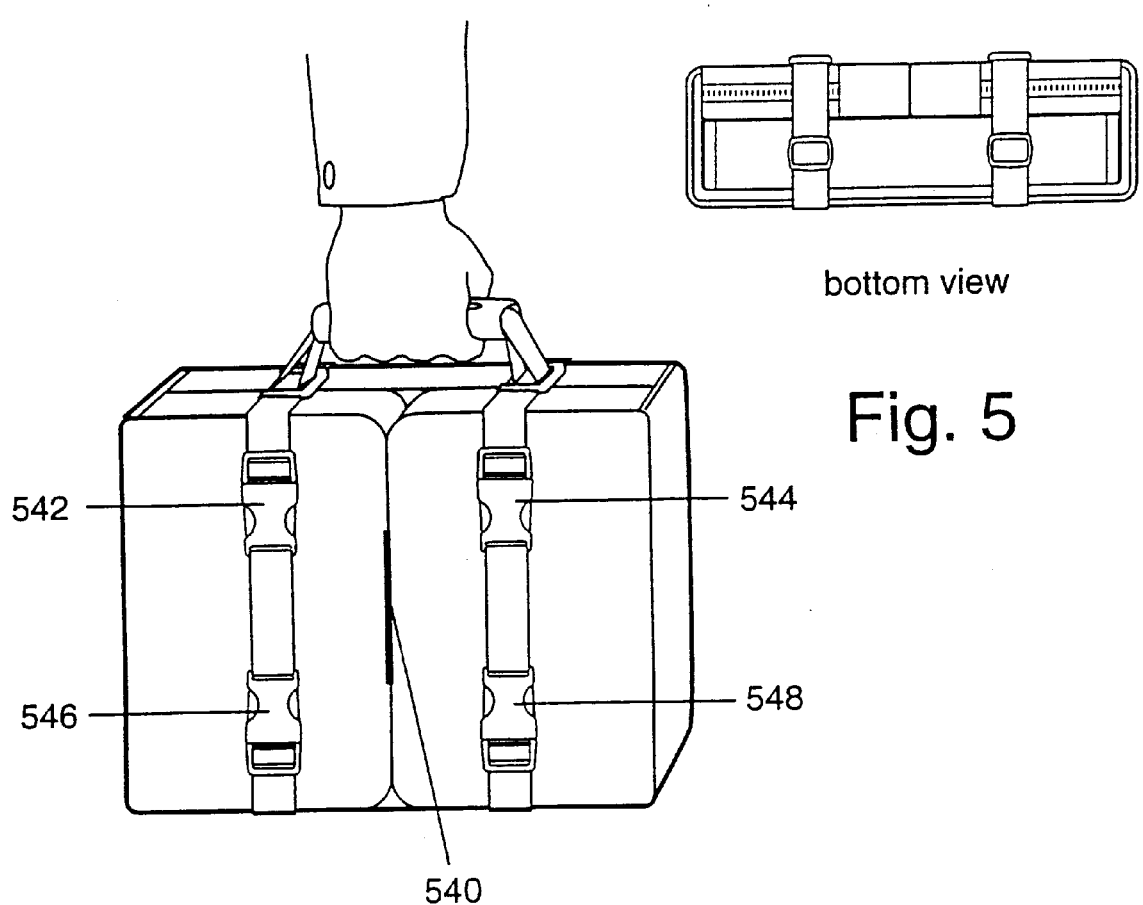
FIG. 5 is a drawing which shows the invention in a folded-up form along with a carrying handle.

Following this initial wrapping of the computer 212, which may take place in reverse order, the side panels are folded onto the overlapping front and rear panels to create a transport configuration, as pictured in FIG. 5. Note that the width W defined in FIG. 4 is determined in large measure by the height H of the compartments and the height of the computer itself, to ensure that this folding process results in a compact yet secure overall configuration. Also, the dimensions of the base panel are preferably such that the side panels hang down on either side of a conventional airline fold-down tray. Note further in FIG. 4 that with the side panels extended on either side, the invention helps to facilitate and organize desktop as well as laptop use.

As seen in FIG. 5, the two side compartment may be held together with a hook-and-loop type fastener 540 therebetween. In addition, buckles 542, 544, 546 and 548, preferably of the quick-release variety, may be used to hold the various components together in a stabilized, balance fashion for transport.

As discussed above, invention need not be used in conjunction with a computer, in which case, the upper surface of the base panel may be used as a writing surface, in which it is preferably proved in a hard, smooth form. In addition, one or both of the surfaces of the pouches which are otherwise folded down onto the computer, may have integrated thereon or attachable therewith a mousepad, enabling one to use a mouse or other pointing device on top of the pouch, for example, if so desired.

Figure 6:
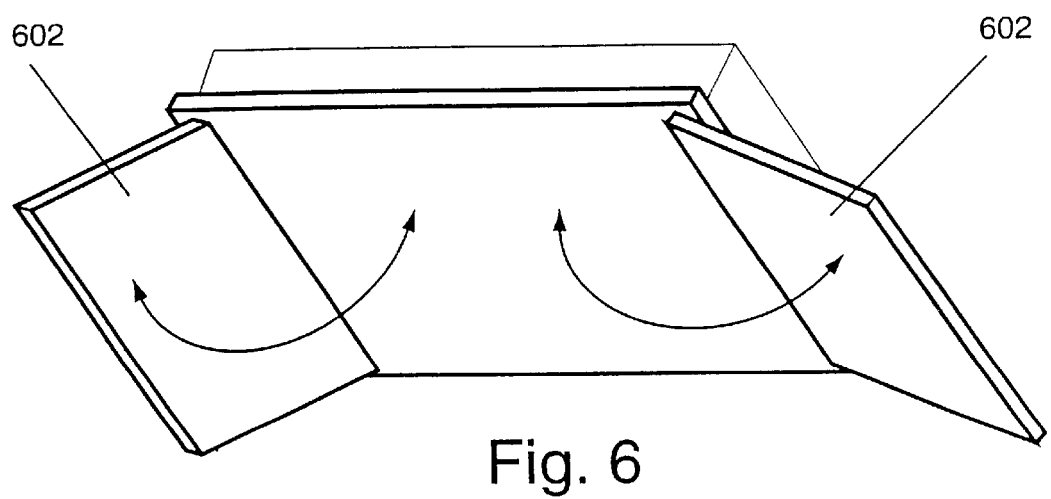
FIG. 6 is an oblique, underside drawing of an alternative embodiment of the invention illustrating how one or more side panels may be unfolded from underneath the inventive article.
Figure 7:
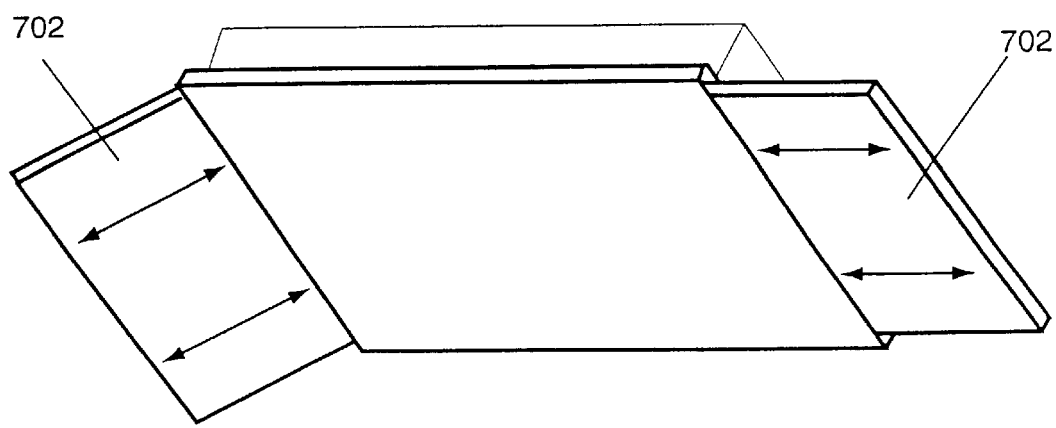
FIG. 7 is an oblique, underside drawing which depicts a further alternative embodiment of the invention wherein side panels slide in and out of a base panel.

Various alternative configurations may also be used in conjunction with the implementation of the side panels according to the invention. As shown in FIG. 1, the side panels 110 and 112 may be at least semi-rigid, in which case fold lines 109 and 111 would be present, however, as shown in FIGS. 2–4, in particular, at least the non-pouch portions of the side panels may be flexible, in which case the base panel may move the transition into the side panels without a clear line of demarcation therebetween, enabling the side panels to drape and follow the contour of the outer, side surfaces of the user's thighs during use of the computing device. FIG. 6 illustrates yet another alternative embodiment, wherein side panels 602 and 604 may be unfolded from underneath a base panel, and FIG. 7 illustrates yet a further alternative embodiment of the invention wherein slots are provided in a base panel into which side panels 702 may be inserted and removed for use.

Figure 8:
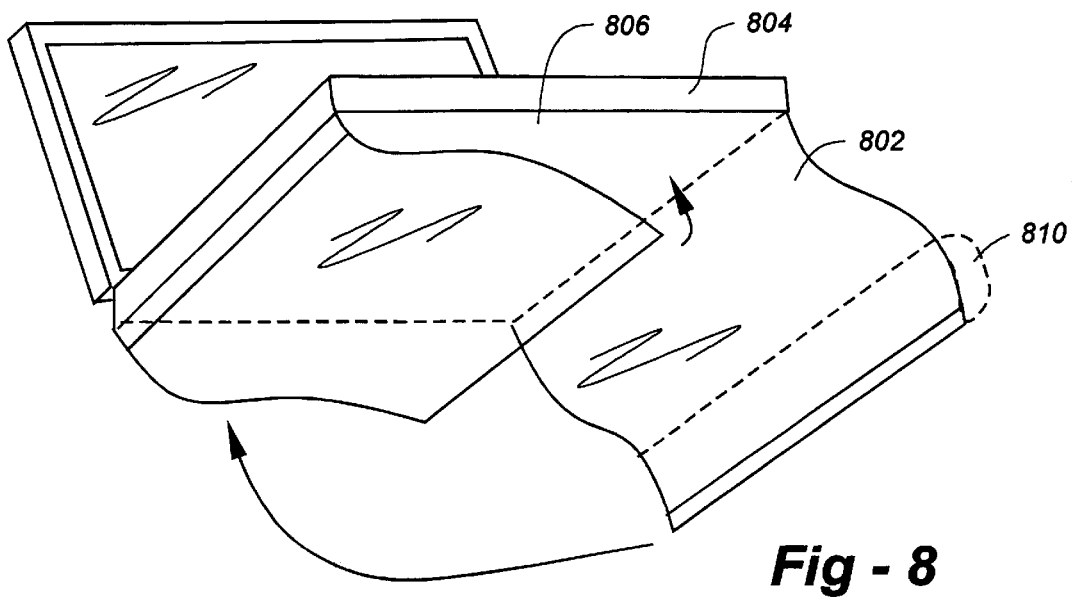
FIG. 8 is a drawing which shows how one or more panels may be attached directly to a portable electronic device according to the invention.

According to different alternative embodiments, the various panels and components comprising the travel gear need not be permanently affixed to one another, and may, in fact, attach to the computing device itself. As shown in FIG. 8, one or more side flaps 802 (which may be rigid or semi-rigid) may be attached directly to a device 804 to be protected, for example to a bottom surface 806. Preferably, two side flaps would be incorporated for this purpose, and would be configured to expose a non-slip surface beneath the device when unfastened. Each flap has a distal edge oriented away from the device when the flaps are disconnected, and this distal edge may be weighted, either with non-usable or usable material. That is, weights in the form of lead pellets, sand, and the like may be used, though, in the preferred embodiments, components associated with use of the device such as batteries 810 would be incorporated for such purpose.

Figure 9:
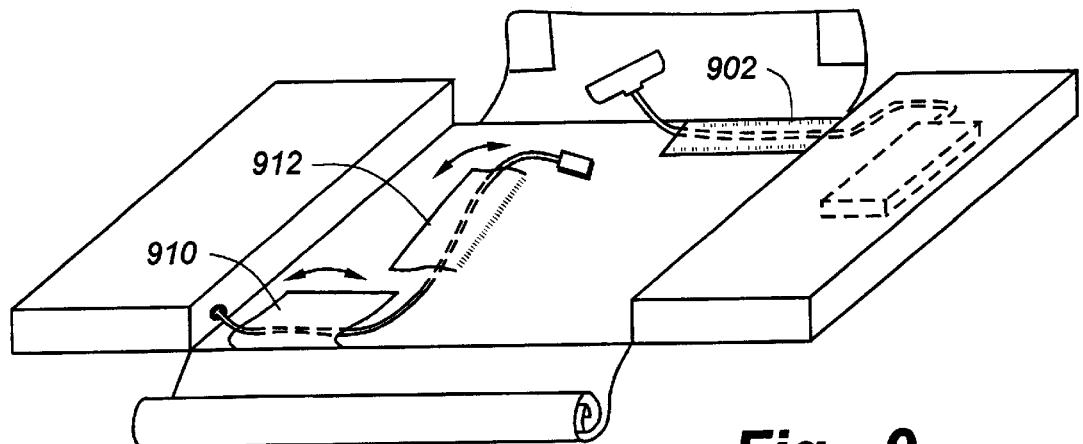
FIG. 9 is a drawing which shows how tunnels or "raceways" may be formed to dress and conceal electrical wiring.

One or more "tunnels" may also be provided for the purpose of dressing cabling from one part of the arrangement to another. For example, as shown in FIG. 9, in the event that a user wishes to make more or less permanent interconnection to an electrical device stored in one of the side pouches, as may be the case with a wireless modem, auxiliary battery, external disk or "zip" drive, a tunnel such as 902 may be provided as shown. Such a tunnel could either be permanently sewn into position or, alternatively, could be created by the user through the use of flexible fastening mechanism such as hook-and-loop fastener, as shown at 910 and 912. It should be understood that the use of such tunnels in a carrying case of this kind is applicable to various configurations, including those without side pockets and intended for other types of applications, so long as the basic principle is met that two pieces of electrical hardware are interconnected through a permanent or configurable tunnel in a flexible enclosure, whether for transport or protection in general.

Figure 10:
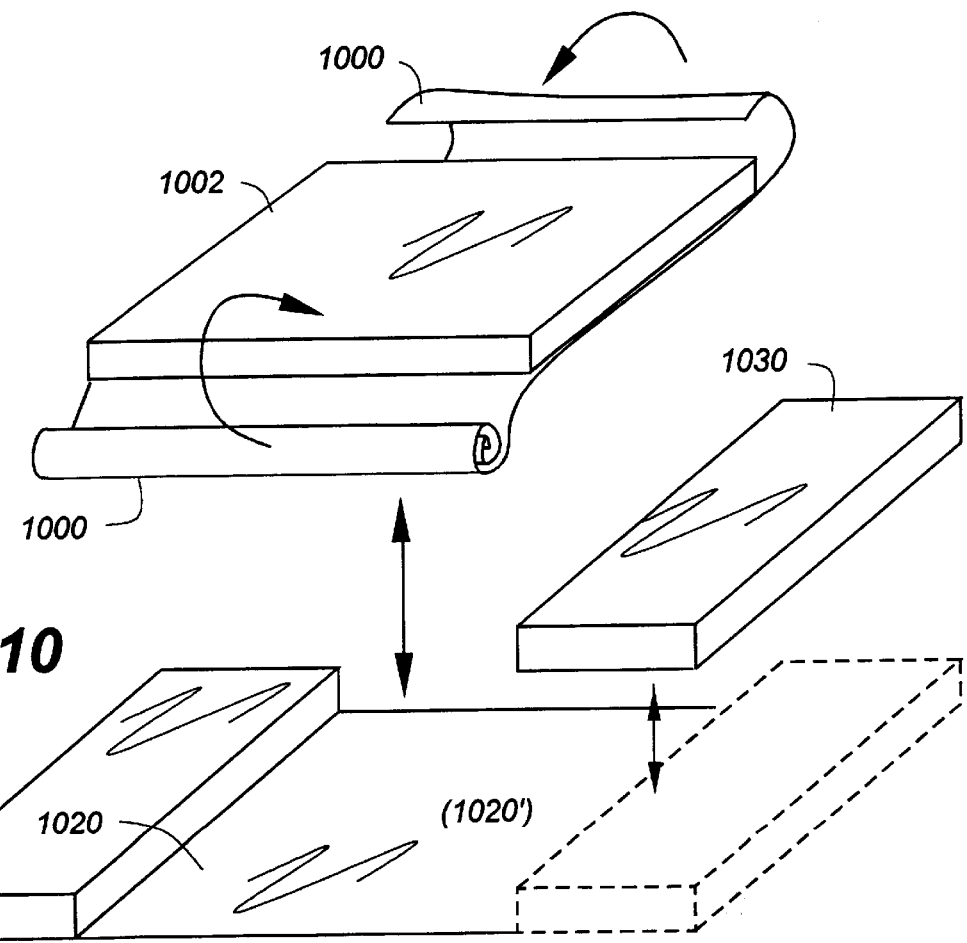
FIG. 10 is a drawing which shows how separate wrappers may be used according to front/back and side-to-side device orientations, and further shows the use of removably attachable storage compartments.

FIG. 10 illustrates yet a further aspect of the invention wherein, as opposed to permanent fixation as through sewing, different modules may be detachable from one another to enhance versatility in certain configurations. In the embodiment shown, for example, a wrapper 1000 for an electronic device 1002 such as a mobile computer includes flaps which may be draped over the equipment so as to protect it, but wherein this folder wrapper is, itself, detachable from a separable unit 1020 containing pouches, other types of fasteners, or carrying handles. It will be appreciated that other configurations having detachable as opposed to permanently affixed subassemblies are also possible. For example, as shown in the figure, the pouches themselves (1030) may be secured through some sort of temporary fastening means, so that they may be used by themselves as a clutch bag, purse, and so forth. Such configurations may be particularly convenient where an individual might have an especially valuable item in one of the side pouches such as a wallet or valuable data, and wishes to detach only that module while, for example, lending the rest of the unit to a different user.

Figure 11:
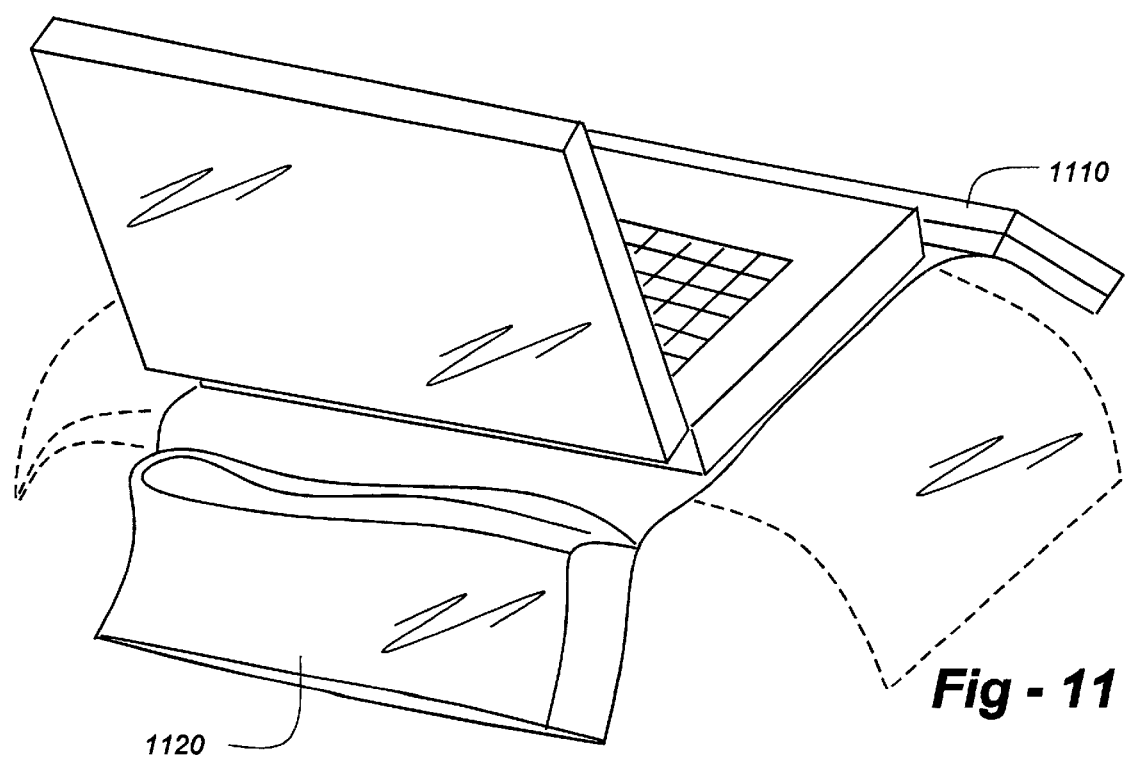
FIG. 11 illustrates how front and/or back storage compartments may be used apart from, or in conjunction with, one or more side compartments.

In addition to side pockets and pouches forward and/or rearward pockets and/or pouches (1110 and 1120) may also be provided, as shown in FIG. 11. As with the other embodiments just discussed, these may be intentionally separable as opposed to permanently affixed as well. Although the materials provided according to the various embodiments of the invention inherently provide a certain level of thermal barrier, particularly those layers used directly beneath the device may include air pockets or other thermally non-conducting materials to insure that when the device is placed upon a user's lap, discomfort due to overheating is minimized.

I claim:

1. An article for use with a laptop computer having top and bottom surfaces, the article comprising:

a base panel having front, rear and two opposing side edges, a lower surface, and an upper surface dimensioned to receive the bottom surface of the laptop computer;

a pair of side panels, each having a first edge hinged to one of the side edges of the base panel and a second edge including fastening means;

at least one storage compartment associated with each side panel; and wherein, in the folded state, each side panel is folded over the base panel with the second edges of each side panel being attached to one another using the fastening means.

2. The article of claim 1, wherein the base panel is at least partially stiffened.

3. The article of claim 1, wherein the side panel is at least partially flexible.

4. The article of claim 1, further including a wrist rest extending from front edge of the base panel.

5. The article of claim 1, further including a mouse pad.

6. An article for use with a laptop computer having top and bottom surfaces, the article comprising:

a base panel having front, rear and two opposing side edges, a lower surface, and an upper surface dimensioned to receive the bottom surface of the laptop computer;

a pair of side panels, each having a first edge hinged to one of the side edges of the base panel and a second edge including fastening means;

at least one storage compartment associated with each side a panel; and wherein, in the unfolded state, the base panel and side panels assume a flattened, horizontal orientation when positioned on a desktop, providing convenient access to the storage compartments with the computer positioned on the upper surface of the base panel.

7. The article of claim 6, wherein the base panel is at least partially stiffened.

8. The article of claim 6, further including a wrist rest extending from front edge of the base panel.

9. The article of claim 6, further including a mouse pad.

10. The article of claim 6, wherein, in the unfolded state, wherein, in the unfolded state, the base panel is adapted to assume a generally horizontal orientation when positioned on a user's lap, the construction of the side panels being such that they readily drapes at least partially down the outer side surface of a user's thigh during use of the computer when positioned on the upper surface of the base panel.

11. An article for use with a laptop computer having top and bottom surfaces, the article comprising:

a base panel having front, rear and two opposing side edges, a lower surface, and an upper surface dimensioned to receive the bottom surface of the laptop computer;

a wrist rest extending from front edge of the base panel;

a pair of side panels, each having a first edge hinged to one of the side edges of the base panel and a second edge including fastening means;

at least one storage compartment associated with each side panel; and wherein, in the folded state, each side panel is folded over the base panel with the second edges of each side panel being attached to one another using the fastening means.

12. The article of claim 11, wherein the base panel is at least partially stiffened.

13. The article of claim 11, further including a mouse pad.

14. The article of claim 11, wherein the side panels are at least partially flexible, such that they readily drapes at least partially down the outer side surface of a user's thighs during use of the computer on a user's lap.

* * * * *